UNITED STATES PATENT OFFICE.

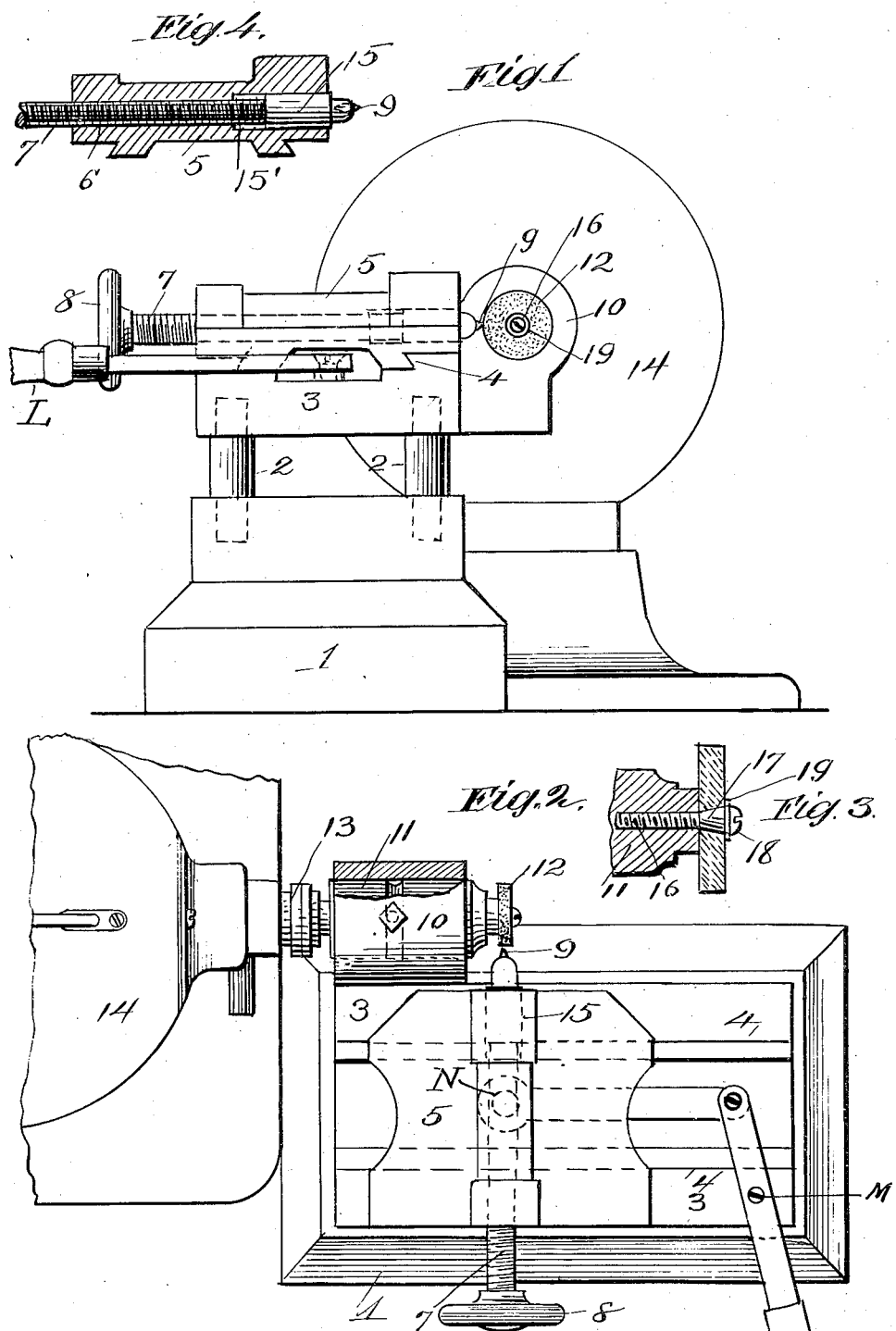

ROY E. BELDEN, OF CLEVELAND, OHIO.

CARBORUNDUM-DISK-TRUING DEVICE.

No. 887,059.  Specification of Letters Patent.  Patented May 12, 1908.

Application filed July 29, 1907. Serial No. 385,979.

*To all whom it may concern:*

Be it known that I, ROY E. BELDEN, a citizen of the United States, and resident of Cleveland, county of Cuyahoga, State of Ohio, have invented certain new and useful Improvements in Carborundum - Disk - Truing Devices, of which I hereby declare the following to be a full, clear, and exact description, such as will enable others skilled in the art to which it appertains to make and use the same.

The objects of the invention are to provide means for renewing the perfect cylindrical shape of the carborundum grinding disk employed in dental offices and thereby restoring them for further use.

Heretofore the carborundum grinding disks employed by dentists have been thrown away after they have been used a few times, since they soon loose their perfect cylindrical surface, and with the slightest irregularity of surface the disks which are driven at a high rate of speed would soon pound a tooth to pieces, or would produce such discomfort in the mouth of a patient that it would be impossible to use them. If, however, their cylindrical form could be restored they could be used again and again until worn out.

With this object in view I employ the diamond turning point, and the rotating mandrel attachable directly to the rapidly rotating shaft of any electric motor ordinarily in use in a dental office, and also I employ the means for securing the carborundum disk to the mandrel and for operating the point and adjusting the depth of the cut, and the details of construction as hereinafter described, shown in the accompanying drawings, and specifically pointed out in the claims.

In the accompanying drawings, Figure 1 is a side elevation of the device; Fig. 2 is a plan view thereof; Fig. 3 is an enlarged central longitudinal section through the end of the mandrel showing the peculiar form of attaching screw for the carborundum disk; Fig. 4 is an enlarged longitudinal central section of the feed screw for the diamond point showing the carriage therefor, and the enlarged extremity of the feed screw and closely fitting bearing therefor.

In these views 1 is a platform upon which is mounted upon movable or adjustable legs 2 the bed plate 3 provided with longitudinal guides 4. Upon these guides is placed the carriage 5 within a transversely arranged screw threaded opening 6 in which is secured the feed screw 7 provided with a device such as a wheel 8 for turning the screw.

The diamond point 9 is secured in the inner extremity of the screw, 10 is a longitudinal bearing for the mandrel 11 to which the carborundum disk 12 is secured. This bearing projects beyond the side of the bed plate 3 to permit of the direct attachment to the mandrel of the extremity of the shaft 13 of a rapidly rotating motor, the casing 14 of which is shown in the figures.

The centers of the mandrel and feed screw for the diamond point are upon a common plane, so that the carriage is moved to operate the diamond point transversely across the face of the disk upon the center line. The carriage is moved by means of the lever L pivoted upon the platform 1, at M, and pivotally attached to the carriage at N.

The inner extremity of the feed screw is cylindrical and preferably enlarged at 15 so as to provide a bearing which will insure perfect alinement of the screw and prevent chattering of the point in the work. Another and very important feature of the invention is also shown in this enlarged head and long bearing 15 since it prevents the fine dust detached from the carborundum wheel in dressing its surface from penetrating to the screw, where it would soon cut the threads thereof and wear it out.

Another important feature of the invention is shown in the means employed for attaching the carborundum disk to the mandrel. In Fig. 3 is shown this device which consists of a screw 16 having a tapered portion 17 which is inserted in the central opening in the disk, and forms an easy method of centering the same. A head 18 and washer 19 on the screw complete the attachments.

The mandrel is provided either with a screw threaded opening or a taper socket for the connection with the motor shaft or prolongation thereof, or may be detachably attached thereto in any desired manner.

The legs upon which the bed plate rests are preferably removable, so that others can be substituted to accommodate height of the motor shaft above its base, and to bring the lines of motor shaft and diamond cutting tool on a level.

Having described the invention what I claim as new and desire to secure by Letters Patent is:—

1. In a device for truing carborundum disks, a platform, a bed plate mounted thereon, removable legs for the bed plate, a longitudinally movable carriage on the bed plate, a transversely placed screw therein, a diamond point in said screw, an enlarged cylindrical head for said screw adjacent to said diamond and a bearing for the cylindrical head in said carriage, longitudinal bearing on said bed plate, and mandrel therein and detachable means for securing said disk upon the said mandrel and centering it thereon, substantially as described.

2. In a device for truing carborundum disks, a platform, a bed plate thereon, provided with longitudinal guides, a carriage mounted in said guides, a transversely placed feed screw in said carriage, a diamond point therein, a cylindrical bearing therefor, on said carriage and a cylindrical portion of said screw therein, an overhanging bearing on said bed plate, a mandrel therein, means for attaching the disk thereto and centering the same and a motor and motor shaft, said shaft being attached to said mandrel, the center lines of said shaft and screw being on a common plane, substantially as described.

3. In a device for truing carborundum disks, in combination, a bed plate, a carriage longitudinally movable therein, a transversely movable screw in said carriage, a diamond point in the inner end of said screw, a rotatable mandrel mounted in said bed plate beyond the inner edge of said carriage, a carborundum disk detachably mounted in said mandrel, a safety device on the screw, adapted to prevent the introduction of carborundum powder thereto, means for rotating the mandrel, and means for moving the carriage longitudinally on said bed plate.

In testimony whereof I hereunto set my hand this 15" day of July, 1907.

ROY E. BELDEN.

In presence of—
  E. R. SHEPARD,
  J. R. COTABISH.